US011808730B2

(12) United States Patent
Sekiya et al.

(10) Patent No.: US 11,808,730 B2
(45) Date of Patent: Nov. 7, 2023

(54) GAS SENSOR ELEMENT

(71) Applicant: NGK INSULATORS, LTD., Nagoya (JP)

(72) Inventors: Takayuki Sekiya, Nisshin (JP); Shota Kageyama, Nagoya (JP); Yusuke Watanabe, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 509 days.

(21) Appl. No.: 16/669,558

(22) Filed: Oct. 31, 2019

(65) Prior Publication Data

US 2020/0064302 A1 Feb. 27, 2020

Related U.S. Application Data

(63) Continuation of application No. PCT/JP2019/011567, filed on Mar. 19, 2019.

(30) Foreign Application Priority Data

Mar. 29, 2018 (JP) ................................. 2018-064017

(51) Int. Cl.
*G01N 27/407* (2006.01)
*G01N 27/417* (2006.01)
*G01N 27/409* (2006.01)

(52) U.S. Cl.
CPC ....... *G01N 27/4071* (2013.01); *G01N 27/417* (2013.01); *G01N 27/409* (2013.01)

(58) Field of Classification Search
CPC .... C04B 2235/3217; C04B 2235/3418; C04B 2235/5445; C04B 2235/963;

(Continued)

(56) References Cited

U.S. PATENT DOCUMENTS 6,284,112 B1 * 9/2001 Kato .................... G01N 27/419
204/429
6,355,152 B1 * 3/2002 Kato .................... G01N 27/419
204/426

(Continued)

FOREIGN PATENT DOCUMENTS

JP 02-091557 A 3/1990
JP 06-160342 A 6/1994

(Continued)

OTHER PUBLICATIONS

International Preliminary Report on Patentability received in corresponding International Application No. PCT/JP2019/011567 dated Oct. 8, 2020.

(Continued)

*Primary Examiner* — Harshad R Patel
*Assistant Examiner* — Gedeon M Kidanu
(74) *Attorney, Agent, or Firm* — Mattingly & Malur, PC

(57) ABSTRACT

A gas sensor element in which oxidation of electrodes and a heater occurring with continued use is suppressed is provided. The gas sensor element includes a plurality of solid electrolyte layers stacked one over another, and includes an electrochemical cell including a pair of electrodes and a portion of the plurality of solid electrolyte layers existing between the pair of electrodes; a heater part capable of heating the gas sensor element; and a gettering layer located between the plurality of solid electrolyte layers and between the plurality of solid electrolyte layers and each of the pair of electrodes, and gettering impurities in a metal component of the electrodes and the heater part during driving of the gas sensor element.

9 Claims, 5 Drawing Sheets

(58) Field of Classification Search
CPC ...... C04B 2237/348; C04B 2235/3225; C04B 2235/6025; C04B 2235/6028; C04B 2237/343; C04B 2237/704; C04B 37/008; C04B 2235/612; C04B 2237/34; C04B 2237/341; C04B 2237/346; C04B 2237/62; C04B 35/10; C04B 35/111; C04B 35/14; C04B 35/453; C04B 35/46; C04B 35/486; C04B 35/6264; C04B 35/6342; C04B 35/63424; C04B 35/63444; C04B 35/63456; C04B 35/6346; C04B 35/63488; C04B 2235/3244; C04B 2235/3246; C04B 2235/5436; C04B 2235/5472; C04B 2235/6023; C04B 2235/604; C04B 2235/6562; C04B 2235/9638; C04B 2237/68; C04B 2237/84; C04B 35/119; C04B 35/4885; C04B 35/62222; C04B 35/62625; C04B 35/62685; C04B 35/6269; C04B 35/634; C04B 2235/606; C04B 2237/86; C04B 35/48; C04B 37/001; C04B 37/003; B32B 18/00; G01N 33/0037; G01N 27/4077

See application file for complete search history.

(56) References Cited

U.S. PATENT DOCUMENTS

| | | | | |
|---|---|---|---|---|
| 7,564,082 | B2* | 7/2009 | Forbes | H01L 21/324 |
| | | | | 257/617 |
| 9,187,374 | B2* | 11/2015 | Omori | C04B 35/46 |
| 2004/0150072 | A1* | 8/2004 | Schnitt | H01L 23/58 |
| | | | | 257/E21.582 |
| 2004/0188251 | A1* | 9/2004 | Kurachi | G01N 27/419 |
| | | | | 204/426 |
| 2008/0105545 | A1* | 5/2008 | Nakagaki | G01N 27/419 |
| | | | | 204/424 |
| 2011/0036715 | A1* | 2/2011 | Horisaka | G01N 27/419 |
| | | | | 204/424 |
| 2011/0083490 | A1* | 4/2011 | Murakami | G01N 27/419 |
| | | | | 73/31.05 |
| 2011/0233060 | A1* | 9/2011 | Horisaka | G01N 27/419 |
| | | | | 204/412 |
| 2013/0260983 | A1* | 10/2013 | Omori | C04B 35/63456 |
| | | | | 501/134 |
| 2014/0076725 | A1* | 3/2014 | Horisaka | G01N 27/419 |
| | | | | 204/427 |
| 2015/0253281 | A1* | 9/2015 | Saito | G01N 27/4071 |
| | | | | 204/416 |
| 2015/0276659 | A1 | 10/2015 | Sekiya et al. | |
| 2015/0276660 | A1* | 10/2015 | Moriyama | G01N 27/4077 |
| | | | | 156/89.12 |
| 2015/0276661 | A1* | 10/2015 | Moriyama | C04B 37/001 |
| | | | | 264/618 |
| 2020/0064302 | A1* | 2/2020 | Sekiya | G01N 27/417 |

FOREIGN PATENT DOCUMENTS

| | | |
|---|---|---|
| JP | 2013-227192 A | 11/2013 |
| JP | 2015-155887 A | 8/2015 |
| JP | 2015-200643 A | 11/2015 |

OTHER PUBLICATIONS

International Search Report of PCT/JP2019/011567 dated Jun. 18, 2019.

* cited by examiner

GAS SENSOR ELEMENT

TECHNICAL FIELD

The present invention relates to sensor elements of gas sensors and, in particular, to suppression of degradation thereof.

BACKGROUND ART

A limiting current gas sensor (NOx sensor) including a sensor element mainly formed of an oxygen-ion conductive solid electrolyte has already been known (see Patent Document 1, for example). In such a gas sensor, to obtain a NOx concentration, a measurement gas is first introduced into a space (an internal space) provided inside the sensor element under a predetermined diffusion resistance, and oxygen in the measurement gas is pumped out by an electrochemical pump cell provided in two stages referred to as a main pump cell and an auxiliary pump cell to sufficiently reduce an oxygen concentration in the measurement gas in advance. NOx in the measurement gas is then reduced or decomposed by a measurement electrode functioning as a reduction catalyst, and oxygen thus generated is pumped out by an electrochemical pump cell including the measurement electrode, referred to as a measurement pump cell, different from the above-mentioned electrochemical pump cell. The NOx concentration is obtained by utilizing a certain functional relationship between a current (NOx current) flowing through the measurement pump cell and the NOx concentration.

Detection of NOx using a gas sensor as disclosed in Patent Document 1 utilizes electrochemical properties of the solid electrolyte forming the sensor element, and, to exhibit the properties, it is necessary to heat the sensor element to a sensor element driving temperature that is a relatively high temperature of approximately 600° C. to 900° C., for example, using a heater provided inside the sensor element.

The sensor element includes various electrodes made of Pt or an alloy formed by adding trace amounts of substances (specifically, a noble metal such as Au and Rh) to Pt. These electrodes come into contact with oxygen in the measurement gas, oxygen generated through decomposition of NOx, or oxygen in atmospheric air in a state of being heated to a high temperature as described above when a gas sensor is in use. Pt and Rh as components of each of the electrodes are thus oxidized to generate PtO, $PtO_2$, and $Rh_2O_3$ with continued use of the gas sensor. These oxides have a lower vapor pressure than Pt, and are thus more likely to vaporize at a low temperature than Pt. Furthermore, if these electrodes contain any impurities, these oxides have a much lower vapor pressure, and are thus much more likely to vaporize. If the impurities contained in these electrodes form nuclei, vapor pressures of Pt and Rh around the nuclei decrease to cause local vaporization of Pt and Rh. Examples of elements that can be contained as the impurities include Fe, Ti, Na, Ca, Mg, K, Ni, and Cu.

When such vaporization is caused, in particular, in a main pump electrode and an auxiliary pump electrode respectively forming the main pump cell and the auxiliary pump cell, and provided to face the internal space, oxygen pumping-out ability of each pump cell is reduced. When such vaporization is caused in the measurement electrode, a catalytic action is reduced to thereby degrade sensitivity (sensor sensitivity) in NOx measurement.

The impurities contained in the electrodes include those originally contained in materials for the electrodes and those entering from the outside when the gas sensor is in use. For example, Mg, Na, S, P, and the like are present as poisoned substances in the gas sensor installed onto an exhaust pipe of a vehicle. Once such poisoned substances adhere to a catalytic electrode, the above-mentioned phenomenon of vaporization is promoted to degrade the sensor sensitivity.

The above-mentioned impurities have an influence on the magnitude of an offset current that is a current flowing through the measurement pump cell in a case where NOx is not present in the measurement gas. One reason is that the impurities act as minority carriers to allow a micro-current to flow.

In a case where Pt is used as a heating body (heater element) of the heater of the sensor element, the heater element is insulated by being covered with porous alumina, but Pt as the heater element is oxidized by oxygen passing through the porous alumina as with the various electrodes with continued use of the gas sensor. A heater resistance increases due to vaporization of PtO and $PtO_2$ generated through oxidation. In a case where the heater element contains any impurities as in the case of the electrodes, local vaporization of Pt is caused to cause a problem of the increase in heater resistance and, further, breakage of the heater element and the like.

PRIOR ART DOCUMENT

Patent Document

Patent Document 1: Japanese Patent Application Laid-Open No. 2015-200643

SUMMARY

The present invention has been conceived in view of the above-mentioned problem, and it is an object of the present invention to provide a gas sensor element in which oxidation of electrodes and a heater occurring with continued use is suppressed.

To solve the above-mentioned problem, a first aspect of the present invention is a gas sensor element including a plurality of solid electrolyte layers stacked one over another; an electrochemical cell including a pair of electrodes and a portion of the plurality of solid electrolyte layers existing between the pair of electrodes; a heater part capable of heating the gas sensor element; and a gettering layer located between the plurality of solid electrolyte layers and between the plurality of solid electrolyte layers and each of the pair of electrodes, and gettering impurities in a metal component of the electrodes and the heater part during driving of the gas sensor element.

A second aspect of the present invention is the gas sensor element according to the first aspect, wherein the plurality of solid electrolyte layers are made of zirconia, and the gettering layer is made of zirconia to which at least one selected from the group consisting of $SiO_2$, $Al_2O_3$, zinc oxide, calcium carbonate, barium carbonate, magnesium carbonate, silicon nitride, aluminum nitride, titania, and spinel is added.

A third aspect of the present invention is the gas sensor element according to the second aspect, wherein the gettering layer is made of zirconia into which $SiO_2$ and $Al_2O_3$ are added at a weight ratio of 0.5 wt % to 12 wt % in total.

A fourth aspect of the present invention is the gas sensor element according to the third aspect, wherein the gettering layer is made of zirconia into which $SiO_2$ and $Al_2O_3$ are added at a weight ratio of 1 wt % to 10 wt % in total.

A fifth aspect of the present invention is the gas sensor element according to any one of the first to fourth aspects, wherein an interlayer gettering layer and an electrode gettering layer formed on the same solid electrolyte layer of the plurality of solid electrolyte layers constitute a single continuous gettering layer, where the interlayer gettering layer is a portion of the gettering layer formed between the plurality of solid electrolyte layers, and the electrode gettering layer is a portion of the gettering layer formed between the plurality of solid electrolyte layers and each of the pair of electrodes.

A sixth aspect of the present invention is the gas sensor element according to the fifth aspect, wherein the gettering layer is located on substantially all of a surface of any adjacent solid electrolyte layer of the plurality of solid electrolyte layers.

According to the first to sixth aspects of the present invention, oxidation of the electrodes and the heater part occurring with continued use of the gas sensor element is suppressed.

DESCRIPTION OF EMBODIMENT

<Schematic Configuration of Gas Sensor>

Figure 1:
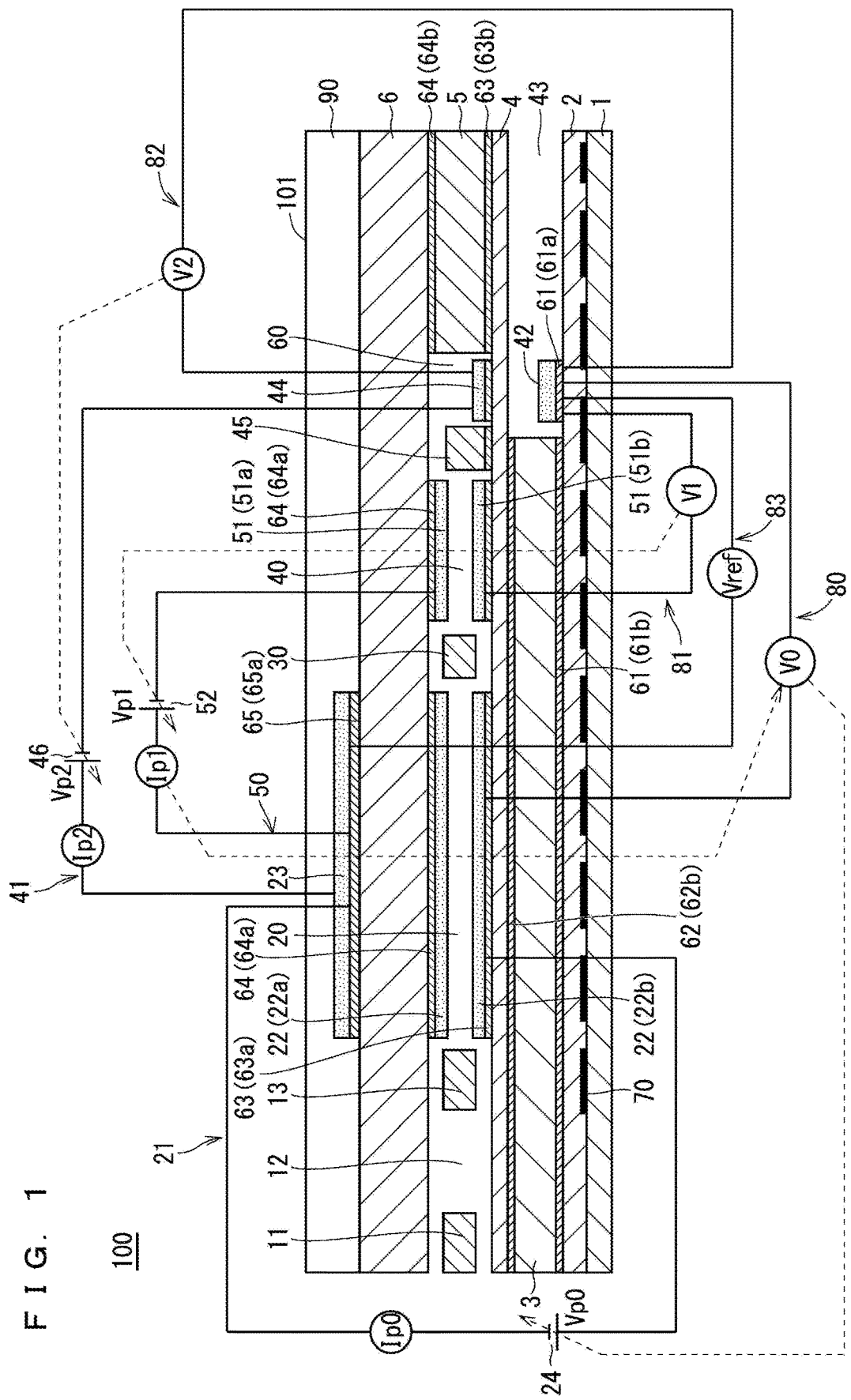
FIG. 1 schematically shows a configuration of a gas sensor 100 including a sectional view taken along a longitudinal direction of a sensor element 101.

FIG. 1 schematically shows a configuration of a gas sensor 100 including a sectional view taken along a longitudinal direction of a sensor element 101 according to an embodiment of the present invention. The gas sensor 100 is one type of a limiting current gas sensor, and is a NOx sensor detecting NOx in a measurement gas, and obtaining the concentration of NOx. The sensor element 101 as a principal part of the gas sensor 100 is made of, as a structural material, ceramic containing, as a main component, zirconia (yttria-stabilized zirconia), which is an oxygen-ion conductive solid electrolyte. The material is hereinafter also simply referred to as the (oxygen-ion conductive) solid electrolyte.

The sensor element 101 schematically has a structure in which six layers of first to sixth solid electrolyte layers 1 to 6 each made of ceramic containing zirconia as a main component are stacked one over another in the stated order from the bottom of FIG. 1. An upper surface and a lower surface of each solid electrolyte layer in FIG. 1 are hereinafter respectively referred to as an upper surface and a lower surface of the solid electrolyte layer for the sake of convenience. The six layers of the first to sixth solid electrolyte layers 1 to 6 are also referred to as a zirconia base.

More specifically, the sensor element 101 is obtained by cutting a laminated body of ceramic green sheets corresponding to the above-mentioned six layers laminated using an adhesive paste containing zirconia into element units, and firing individual element bodies as obtained. Interlayer bonding layers containing zirconia formed by firing the adhesive paste are thus interposed between the above-mentioned six layers. That is to say, the zirconia base of the sensor element 101 is said to be formed by bonding the six layers of the first to sixth solid electrolyte layers 1 to 6 using the interlayer bonding layers. In the process of firing, ceramic is sintered while organic matter present in the ceramic green sheets and the adhesive paste vaporizes, and thus the interlayer bonding layers are integral with the zirconia base, whether it is derived from the ceramic green sheets or the adhesive paste.

In the sensor element 101 according to the present embodiment, interlayer bonding layers interposed between the second to sixth solid electrolyte layers 2 to 6 are gettering layers. In addition, various electrodes included in the sensor element 101 are formed over corresponding solid electrolyte layers via the gettering layers. The gettering layers are layers having the action to getter (capture) impurities diffused inside the sensor element 101. Details of the gettering layers, however, will be described below. Any references to the gettering layers are omitted before description of the details for ease of explanation. For example, even if a certain electrode is formed over a solid electrolyte layer via a gettering layer, the electrode is simply described to be formed over the solid electrolyte layer.

A first diffusion control part 11 doubling as a gas inlet, a first internal space 20, a second diffusion control part 30, a second internal space 40, a third diffusion control part 45, and a third internal space 60 are provided between a lower surface of the sixth solid electrolyte layer 6 and an upper surface of the fourth solid electrolyte layer 4 on a side of one leading end portion of the sensor element 101. Furthermore, a buffer space 12 and a fourth diffusion control part 13 may be provided between the first diffusion control part 11 and the first internal space 20. The first diffusion control part 11, the buffer space 12, the fourth diffusion control part 13, the first internal space 20, the second diffusion control part 30, the second internal space 40, the third diffusion control part 45, and the third internal space 60 are adjacently formed to communicate with each other in the stated order. A part from the first diffusion control part 11 to the third internal space 60 is also referred to as a gas distribution part.

The buffer space 12, the first internal space 20, the second internal space 40, and the third internal space 60 are internal spaces that look as if they were provided by hollowing out the fifth solid electrolyte layer 5. The buffer space 12, the first internal space 20, the second internal space 40, and the third internal space 60 have an upper portion, a lower portion, and a side portion respectively defined by the lower surface of the sixth solid electrolyte layer 6, the upper surface of the fourth solid electrolyte layer 4, and a side surface of the fifth solid electrolyte layer 5.

The first diffusion control part 11, the second diffusion control part 30, the fourth diffusion control part 13, and the third diffusion control part 45 are each provided as two horizontally long slits (with an opening having a longitudinal direction perpendicular to the drawing).

At a location farther from a side of one leading end than the gas distribution part is, a reference gas introduction space 43 is provided from the other end portion to a portion immediately below the third internal space 60 between an upper surface of the second solid electrolyte layer 2 and a lower surface of the fourth solid electrolyte layer 4. The reference gas introduction space 43 is an internal space having an upper portion, a lower portion, and a side portion respectively defined by the lower surface of the fourth solid electrolyte layer 4, the upper surface of the second solid electrolyte layer 2, and a side surface of the third solid electrolyte layer 3. Atmospheric air is, for example, introduced into the reference gas introduction space 43 as a reference gas.

The first diffusion control part 11 is a part taking the measurement gas from the outside of the sensor element 101 while providing a predetermined diffusion resistance.

The buffer space 12 is provided to cancel concentration fluctuations of the measurement gas caused by pressure fluctuations (pulsation of exhaust pressure in a case where the measurement gas is an exhaust gas of a vehicle) of the measurement gas in an external space. The sensor element 101 is not necessarily required to include the buffer space 12.

The fourth diffusion control part 13 is a part providing a predetermined diffusion resistance to the measurement gas introduced from the buffer space 12 to the first internal space 20. The fourth diffusion control part 13 is a part provided in association with the buffer space 12.

The measurement gas is abruptly taken into the sensor element 101 through the first diffusion control part 11 by the pressure fluctuations (the pulsation of the exhaust pressure in the case where the measurement gas is the exhaust gas of the vehicle) of the measurement gas in the external space, but is not directly introduced into the first internal space 20 and is introduced into the first internal space 20 after the concentration fluctuations of the measurement gas are canceled through the first diffusion control part 11, the buffer space 12, and the fourth diffusion control part 13. This makes the concentration fluctuations of the measurement gas introduced into the first internal space 20 almost negligible.

The first internal space 20 is provided as a space to adjust oxygen partial pressure in the measurement gas introduced through the first diffusion control part 11. The oxygen partial pressure is adjusted by operation of a main pump cell 21.

The main pump cell 21 is an electrochemical pump cell including an inner pump electrode 22 provided to upper and lower solid electrolyte layers (the sixth solid electrolyte layer 6 and the fourth solid electrolyte layer 4) defining the first internal space 20, an outer pump electrode 23 provided over an upper surface of the sixth solid electrolyte layer 6, and a solid electrolyte layer sandwiched between these electrodes.

The inner pump electrode 22 includes a ceiling electrode portion 22a formed over the lower surface of the sixth solid electrolyte layer 6, which provides a ceiling surface to the first internal space 20, and a bottom electrode portion 22b formed over the upper surface of the fourth solid electrolyte layer 4, which provides a bottom surface to the first internal space 20. The ceiling electrode portion 22a and the bottom electrode portion 22b are connected by conduction portions (not illustrated) provided over side wall surfaces (inner surfaces) of the fifth solid electrolyte layer 5 constituting opposite side wall portions of the first internal space 20.

The ceiling electrode portion 22a and the bottom electrode portion 22b are each provided to be rectangular in plan view. Only the ceiling electrode portion 22a or only the bottom electrode portion 22b may be provided.

The inner pump electrode 22 is formed as a porous cermet electrode. The inner pump electrode 22 is formed using a material having a weakened or no reducing ability with respect to a NOx component in the measurement gas. That is to say, the inner pump electrode 22 is provided as a low NO reducible pump electrode in which reducibility with respect to a NO component is suppressed. Specifically, the inner pump electrode 22 is formed as a cermet electrode made of Pt containing 0.1 wt % to 30 wt % of Au (an Au—Pt alloy) and zirconia. A weight ratio of the Au—Pt alloy to zirconia is only required to be approximately 9:1 to 5:5.

The outer pump electrode 23 is formed to be rectangular in plan view as a cermet electrode made of Pt or a Pt alloy and zirconia, for example.

The main pump cell 21 can pump out oxygen in the first internal space 20 to the external space or pump in oxygen in the external space to the first internal space 20 by using a variable power supply 24 provided external to the sensor element 101 to apply a pump voltage Vp0 to allow a pump current Ip0 to flow between the outer pump electrode 23 and the inner pump electrode 22 in a positive or negative direction.

In the sensor element 101, the inner pump electrode 22, a reference electrode 42 provided over the upper surface of the second solid electrolyte layer 2 to face the reference gas introduction space 43, and an oxygen-ion conductive solid electrolyte sandwiched between these electrodes constitute a first oxygen partial-pressure detection sensor cell 80 as an electrochemical sensor cell to detect an oxygen concentration (the oxygen partial pressure) in the atmosphere in the first internal space 20. The reference electrode 42 is an electrode formed of a porous cermet as with the outer pump electrode and the like and being substantially rectangular in plan view. In the first oxygen partial-pressure detection sensor cell 80, electromotive force V0 is generated between the inner pump electrode 22 and the reference electrode 42 due to a difference in oxygen concentration between the atmosphere in the first internal space 20 and the reference gas in the reference gas introduction space 43.

The electromotive force V0 generated in the first oxygen partial-pressure detection sensor cell 80 varies depending on the oxygen partial pressure in the atmosphere in the first internal space 20. In the sensor element 101, the electromotive force V0 is used to perform feedback control of the variable power supply 24 for the main pump cell 21. The pump voltage Vp0 applied by the variable power supply 24 to the main pump cell 21 can thereby be controlled in accordance with the oxygen partial pressure in the atmosphere in the first internal space 20. In the sensor element 101 according to the present embodiment, the pump voltage Vp0 applied by the variable power supply 24 to the main pump cell 21 is controlled so that the oxygen partial pressure in the atmosphere in the first internal space 20 has a predetermined value low enough to enable control of the oxygen partial pressure in the second internal space 40.

The second diffusion control part 30 is a part providing a predetermined diffusion resistance to the measurement gas introduced from the first internal space 20 to the second internal space 40.

The second internal space 40 is provided as a space to perform processing to further adjust the oxygen concentration (oxygen partial pressure) in the measurement gas introduced through the second diffusion control part 30.

After the oxygen concentration (oxygen partial pressure) is adjusted in advance in the first internal space 20, an auxiliary pump cell 50 further adjusts the oxygen partial pressure in the measurement gas introduced through the second diffusion control part 30 in the second internal space 40. The oxygen concentration in the second internal space 40 can thereby be maintained constant with high accuracy, so as to enable the gas sensor 100 to measure the NOx concentration with high accuracy.

The auxiliary pump cell 50 is an electrochemical pump cell including an auxiliary pump electrode 51 provided to upper and lower solid electrolyte layers (the sixth solid electrolyte layer 6 and the fourth solid electrolyte layer 4) defining the second internal space 40, the outer pump electrode 23, and an oxygen-ion conductive solid electrolyte sandwiched between these electrodes.

The auxiliary pump electrode 51 includes a ceiling electrode portion 51*a* formed over the lower surface of the sixth solid electrolyte layer 6, which provides a ceiling surface to the second internal space 40, and a bottom electrode portion 51*b* formed over the upper surface of the fourth solid electrolyte layer 4, which provides a bottom surface to the second internal space 40. The ceiling electrode portion 51*a* and the bottom electrode portion 51*b* are connected by conduction portions (not illustrated) provided over side wall surfaces (inner surfaces) of the fifth solid electrolyte layer 5 constituting opposite side wall portions of the second internal space 40.

The ceiling electrode portion 51*a* and the bottom electrode portion 51*b* are each provided to be rectangular in plan view. Only the ceiling electrode portion 51*a* or only the bottom electrode portion 51*b* may be provided.

The auxiliary pump cell 50 can pump out oxygen from the second internal space 40 by using a variable power supply 52 provided external to the sensor element 101 to apply a pump voltage Vp1 to allow a pump current Ip1 to flow between the outer pump electrode 23 and the auxiliary pump electrode 51 in a positive direction.

In the sensor element 101, the auxiliary pump electrode 51, the reference electrode 42, and an oxygen-ion conductive solid electrolyte sandwiched between these electrodes constitute a second oxygen partial-pressure detection sensor cell 81 as an electrochemical sensor cell. In the second oxygen partial-pressure detection sensor cell 81, electromotive force V1 is generated between the auxiliary pump electrode 51 and the reference electrode 42 due to a difference in oxygen concentration between the atmosphere in the second internal space 40 and the reference gas (atmospheric air) in the reference gas introduction space 43.

The electromotive force V1 generated in the second oxygen partial-pressure detection sensor cell 81 varies depending on the oxygen partial pressure in the atmosphere in the second internal space 40. In the sensor element 101, the electromotive force V1 is used to perform feedback control of the variable power supply 52 for the auxiliary pump cell 50. The pump voltage Vp1 applied by the variable power supply 52 to the auxiliary pump cell 50 can thereby be controlled in accordance with the oxygen partial pressure in the atmosphere in the second internal space 40. In the sensor element 101 according to the present embodiment, the pump voltage Vp1 applied by the variable power supply 52 to the auxiliary pump cell 50 is controlled so that the oxygen partial pressure in the atmosphere in the second internal space 40 has a predetermined value low enough to have substantially no influence on measurement of the NOx concentration.

The third diffusion control part 45 is a part providing a predetermined diffusion resistance to the measurement gas introduced from the second internal space 40 to the third internal space 60.

The third internal space 60 is provided as a space to perform processing relating to measurement of the concentration of a NOx gas in the measurement gas introduced through the third diffusion control part 45. In the sensor element 101, oxygen in the third internal space 60 can be pumped out by operation of a measurement pump cell 41. The measurement pump cell 41 is an electrochemical pump cell including the outer pump electrode 23, a measurement electrode 44, and an oxygen-ion conductive solid electrolyte sandwiched between these electrodes.

The measurement electrode 44 is a porous cermet electrode provided to face the third internal space 60 and being substantially rectangular in plan view. The measurement electrode 44 is formed of metal that can reduce the NOx gas and a porous cermet made of zirconia. A metal component containing Pt as a main component and Rh added thereto can be used. The measurement electrode 44 thereby functions as a NOx reduction catalyst reducing NOx in the atmosphere in the third internal space 60. In the measurement electrode 44, NOx in the measurement gas is reduced or decomposed by a catalytic activity action thereof to generate oxygen.

The sensor element 101 further includes a measurement sensor cell 82. The measurement sensor cell 82 is an electrochemical sensor cell including the measurement electrode 44, the reference electrode 42, and an oxygen-ion conductive solid electrolyte sandwiched between these electrodes. In the measurement sensor cell 82, electromotive force V2 is generated between the measurement electrode 44 and the reference electrode 42 in accordance with a difference in oxygen concentration between the atmosphere in the third internal space 60 (in particular, the atmosphere in the vicinity of the surface of the measurement electrode 44) and the reference gas in the reference gas introduction space 43. In the sensor element 101, feedback control of a variable power supply 46 for the measurement pump cell 41 provided external to the sensor element 101 is performed based on the electromotive force V2 to control a pump voltage Vp2 applied by the variable power supply 46 to the measurement pump cell 41 in accordance with the oxygen partial pressure in the atmosphere in the third internal space 60.

The measurement gas reaches the third internal space 60 after oxygen is pumped out in the first internal space 20 and the second internal space 40, and thus, if oxygen is present in the atmosphere in the third internal space 60, it is generated through decomposition of NOx by the measurement electrode 44. A current (NOx current) Ip2 flowing through the measurement pump cell 41 is thus substantially proportional to the NOx concentration in the measurement gas (the NOx current Ip2 and the NOx concentration have a linear relationship). In the sensor element 101, the NOx current Ip2 is detected, and the NOx concentration in the measurement gas is obtained based on a functional relationship (the linear relationship) between the NOx current Ip2 and the NOx concentration, specified in advance.

The outer pump electrode 23, the reference electrode 42, and an oxygen-ion conductive solid electrolyte sandwiched between these electrodes constitute an electrochemical sensor cell 83, and the oxygen partial pressure in the measurement gas external to the sensor element 101 can be detected using electromotive force Vref obtained by the sensor cell 83.

The sensor element 101 further includes a heater part 70 vertically sandwiched between the first solid electrolyte layer 1 and the second solid electrolyte layer 2. The heater part 70 has a configuration in which a heater element made of Pt is surrounded by an insulating film made, for example, of alumina. The heater part 70 generates heat by the heater element being externally powered through a heater electrode, which is not illustrated, provided over a lower surface of the first solid electrolyte layer 1. The heater part 70 generates heat to enhance oxygen-ion conductivity of the solid electrolytes forming the sensor element 101. The sensor element 101 is used in a state of being heated to a sensor element driving temperature of 600° C. to 900° C. by the heater part 70. The heater part 70 is buried over a whole range from the first internal space 20 to the third internal space 60, and can heat and maintain a predetermined site of the sensor element 101 to a predetermined temperature.

On the other hand, a surface protective layer 90 is further provided over the upper surface of the sixth solid electrolyte layer 6. The surface protective layer 90 is a layer made of alumina, and is provided to prevent adherence of foreign matter and poisoned substances to the sixth solid electrolyte layer 6 and the outer pump electrode 23. The surface protective layer 90 thus functions as a pump electrode protective layer protecting the outer pump electrode 23.

In the gas sensor 100 having such a configuration, oxygen contained in the measurement gas is pumped out by operation of the main pump cell 21 and, further, the auxiliary pump cell 50, and the measurement gas having oxygen partial pressure (of 0.0001 ppm to 1 ppm, for example) low enough to have substantially no influence on measurement of NOx reaches the measurement electrode 44. The measurement electrode 44 reduces NOx in the measurement gas having reached the measurement electrode 44 to generate oxygen. While oxygen as generated is pumped out by the measurement pump cell 41, the NOx current Ip2 flowing when oxygen is pumped out and the NOx concentration in the measurement gas have a certain functional relationship (hereinafter, referred to as sensitivity characteristics).

The sensitivity characteristics are specified in advance using a plurality of types of model gases having known NOx concentrations prior to actual use of the gas sensor 100, and data thereof is stored in a controller, which is not illustrated. In the actual use of the gas sensor 100, a signal indicating a value of the flowing NOx current Ip2 is provided moment by moment to the controller in accordance with the NOx concentration in the measurement gas, and the controller sequentially computes and outputs the NOx concentration based on the value and the specified sensitivity characteristics. According to the gas sensor 100, the NOx concentration in the measurement gas can thereby be known in almost real time.

<Gettering Layers>

The gettering layers included in the sensor element 101 will be described next. As described above, in the sensor element 101 according to the present embodiment, the interlayer bonding layers interposed between the second to sixth solid electrolyte layers 2 to 6 are the gettering layers. The various electrodes included in the sensor element 101 are formed over the solid electrolyte layers via the gettering layers.

Specifically, gettering layers 61, 62, 63, 64, and 65 are respectively provided at locations on the upper surface of the second solid electrolyte layer 2, an upper surface of the third solid electrolyte layer 3, the upper surface of the fourth solid electrolyte layer 4, the lower surface of the sixth solid electrolyte layer 6, and the upper surface of the sixth solid electrolyte layer 6 in the stated order. Portions of the gettering layers 61 to 65 provided between the solid electrolyte layers and the electrodes are referred to as electrode gettering layer portions. Portions of those being the interlayer bonding layers are referred to as interlayer gettering layer portions.

More specifically, the gettering layer 61 includes an electrode gettering layer portion 61a between the reference electrode 42 and the second solid electrolyte layer 2, and an interlayer gettering layer portion 61b being an interlayer bonding layer between the second solid electrolyte layer 2 and the third solid electrolyte layer 3. The gettering layer 62 as a whole is an interlayer gettering layer portion 62b being an interlayer bonding layer between the third solid electrolyte layer 3 and the fourth solid electrolyte layer 4. The gettering layer 63 includes an electrode gettering layer portion 63a between the fourth solid electrolyte layer 4 and each of the bottom electrode portion 22b of the inner pump electrode 22, the bottom electrode portion 51b of the auxiliary pump electrode 51, and the measurement electrode 44, and an interlayer gettering layer portion 63b being an interlayer bonding layer between the fourth solid electrolyte layer 4 and the fifth solid electrolyte layer 5. The gettering layer 64 includes an electrode gettering layer portion 64a between the sixth solid electrolyte layer 6 and each of the ceiling electrode portion 22a of the inner pump electrode 22 and the ceiling electrode portion 51a of the auxiliary pump electrode 51, and an interlayer gettering layer portion 64b being an interlayer bonding layer between the fifth solid electrolyte layer 5 and the sixth solid electrolyte layer 6. Furthermore, the gettering layer 65 as a whole is an electrode gettering layer portion 65a between the outer pump electrode 23 and the sixth solid electrolyte layer 6.

The gettering layers 61 to 65 as described above are layers made of ceramic containing zirconia (yttria-stabilized zirconia), which is an oxygen-ion conductive solid electrolyte, as a main component as with the first to sixth solid electrolyte layers 1 to 6. Although the first to sixth solid electrolyte layers 1 to 6 are made substantially only of zirconia (yttria-stabilized zirconia) and contain the other substances at most as unintended impurities, the gettering layers 61 to 65 are characterized in that $SiO_2$ and $Al_2O_3$ are intentionally added internally to zirconia at a weight ratio of 0.5 wt % to 12 wt % in total, and preferably at a weight ratio of 1 wt % to 10 wt % in total. It is noted that zirconium oxide ($ZrO_2$) typically contains approximately 5 wt % of hardly-separable hafnium oxide ($HfO_2$), but the hafnium oxide is understood as a part of zirconia in the present embodiment.

The gettering layers 61 to 65 have an effect (a gettering effect) of gettering (capturing) impurities diffused from the electrodes and the heater part 70, to thereby enhance the purity of Pt and Rh in the sensor element 101 heated by the heater part 70 to the sensor element driving temperature. Examples of elements that can be contained as the impurities include Fe, Ti, Na, Ca, Mg, K, Ni, and Cu.

The gettering layers 61 to 65 suppress local vaporization of Pt and Rh caused by formation of nuclei of the impurities in the electrodes and the heater element, and reduction in vapor pressure of the oxides generated through oxidation of Pt and Rh when the gas sensor 100 is in use. Reduction in sensitivity of the gas sensor 100 and degradation of the heater part occurring with continued use of the gas sensor 100 are thereby suppressed.

A weight ratio of $SiO_2$ and $Al_2O_3$ in total of more than 12 wt % in the gettering layers 61 to 65 is not preferable because ion conductivity in the gettering layers 61 to 65 is reduced to increase resistance in a solid electrolyte portion of the sensor element 101, to thereby reduce the function as the sensor element 101.

A weight ratio of $SiO_2$ and $Al_2O_3$ in total of less than 0.5 wt % in the gettering layers 61 to 65 is not preferable because a sufficient gettering effect cannot be obtained. From the viewpoint of more surely obtaining the gettering effect, the weight ratio is preferably 1 wt % or more.

Each of the electrodes of the sensor element 101 is provided as a cermet electrode, and a ceramic portion of the cermet electrode is made of zirconia. $SiO_2$ and $Al_2O_3$ are present also in the ceramic portion while ratios thereof are lower than those in the gettering layers, but the ceramic portion does not have the gettering effect because it is merely a component of the electrode itself.

<Procedures for Manufacturing Sensor Element Including Gettering Layers>

The gettering layers 61 to 65 can be formed in the process of manufacturing the sensor element 101, for example, by printing patterns of the gettering layers 61 to 65, and also by laminating green sheets for formation of the gettering layers on green sheets for formation of the first to sixth solid electrolyte layers 1 to 6.

Figure 2:
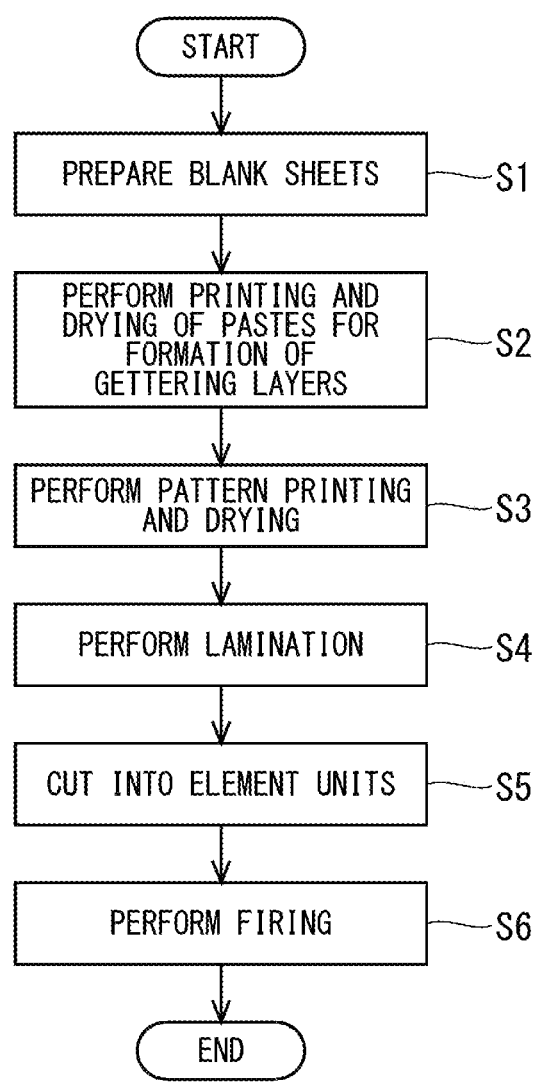
FIG. 2 is a flowchart of processing to manufacture the sensor element 101 in a case where gettering layers 61 to 65 are formed by printing.

FIG. 2 is a flowchart of processing to manufacture the sensor element 101 in a case where the gettering layers 61 to 65 are formed by printing.

In the manufacture of the sensor element 101, blank sheets (not illustrated) that are green sheets made of ceramic containing zirconia as a main component and having no pattern formed thereon are prepared first (step S1). In the manufacture of the sensor element 101 including six solid electrolyte layers, six blank sheets corresponding to the respective layers are prepared. The blank sheets have a plurality of sheet holes used for positioning in printing and lamination. The sheet holes are formed to the blank sheets in advance prior to pattern formation through, for example, punching by a punching machine. Green sheets corresponding to layers in which internal spaces are formed include penetrating portions corresponding to the internal spaces provided in advance through, for example, punching as described above. The blank sheets corresponding to the respective solid electrolyte layers of the sensor element 101 are not required to have the same thickness.

After preparation of the blank sheets corresponding to the respective layers, printing and drying of patterns becoming the gettering layers 61 to 65 after firing are performed on target predetermined blank sheets (step S2). The patterns of the gettering layers 61 to 65 are printed by applying pastes for formation of the patterns of the gettering layers prepared in advance onto the blank sheets using known screen printing technology.

Since the portions of the gettering layers 61 to 65 being the interlayer gettering layers are required to be provided to function as the interlayer bonding layers bonding the solid electrolyte layers as described above, the pastes for formation of the patterns of the gettering layers are prepared not only to intentionally contain $SiO_2$ and $Al_2O_3$ in addition to zirconia as a main component in the ceramic component but also to develop the function in the interlayer gettering layers formed after firing. This is achieved, for example, by containing the ceramic component at a volume ratio of 8% to 18%.

The pastes for formation of the patterns of the gettering layers also contain, as an organic component being a binder, a typical plasticizer and any solvent that is phthalic or can dissolve resin component. Examples thereof include isopropyl alcohol, acetone, 2-ethylhexanol, dioctyl phthalate, alkyl acetalized polyvinyl alcohol.

A known drying means can be used for drying after printing, and drying is performed to the extent that adhesion of the pastes for formation of the patterns of the gettering layers is maintained.

In a case illustrated in FIG. 1, no gettering layer is provided between the first solid electrolyte layer 1 and the second solid electrolyte layer 2. In such a case, an adhesive is simply printed on a green sheet corresponding to the first solid electrolyte layer 1 and dried. Alternatively, an insulating layer paste for formation of a pattern of an insulating layer in the heater part may be prepared to have adhesion, and printed on the green sheet corresponding to the first solid electrolyte layer 1.

After formation of the patterns of the gettering layers 61 to 65, patterns of various electrodes are printed on corresponding patterns of the gettering layers, and dried (step S3). Specifically, the patterns are printed by applying pastes for formation of the patterns of the electrodes prepared in accordance with the respective electrodes onto the blank sheets using the known screen printing technology. The known drying means can be used for drying after printing. At the timing of pattern printing, a pattern of the heater element is printed and dried, and sublimable materials for formation of the first diffusion control part 11, the fourth diffusion control part 13, the second diffusion control part 30, and the third diffusion control part 45 are applied or placed.

The green sheets on which various patterns have been formed are then stacked in a predetermined order, and the stacked green sheets are crimped under predetermined temperature and pressure conditions to thereby form a single laminated body (step S4). Specifically, crimping is performed by stacking and holding the green sheets as a target of lamination on a predetermined lamination jig, which is not illustrated, while positioning the green sheets at the sheet holes, and then heating and pressurizing the green sheets together with the lamination jig using a lamination machine, such as a known hydraulic pressing machine. The pressure, temperature, and time for heating and pressurizing depend on a lamination machine to be used, and these conditions may be determined appropriately to achieve good lamination.

After the laminated body is obtained as described above, the laminated body is cut out at a plurality of locations to obtain individual units (referred to as element bodies) of sensor elements 101 (step S5).

The element bodies as obtained are each fired at a firing temperature of approximately 1300° C. to 1500° C. (step S6). The sensor element 101 is thereby manufactured. That is to say, the sensor element 101 is generated by integrally firing the solid electrolyte layers, the gettering layers, and the electrodes.

The sensor element 101 thus obtained is housed in a predetermined housing, and built into the body, which is not illustrated, of the gas sensor 100.

<Expansion of Gettering Layers>

Figure 3:
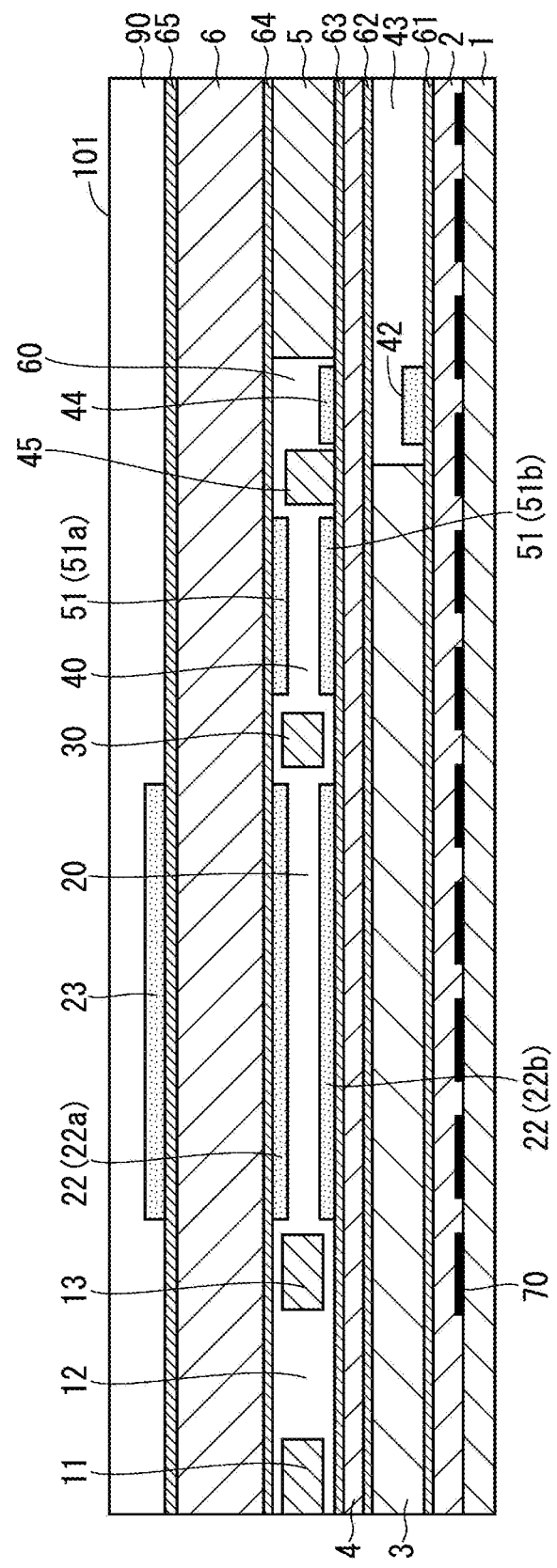
FIG. 3 illustrates a more practical example of the sensor element 101.

FIG. 3 is a sectional view illustrating a more practical example of the sensor element 101. The sensor element 101 in FIG. 3 differs from the sensor element 101 in FIG. 1 in that the gettering layers 61 to 65 are each formed on substantially all of the surface of an adjacent solid electrolyte layer. Substantially all of the surface herein means a whole of a range in which formation is possible.

That is to say, in the sensor element 101 illustrated in FIG. 3, the gettering layers 61 to 65 are provided to be expanded to portions between interlayer gettering layers and electrode gettering layers and portions not sandwiched between solid electrolyte layers. In other words, an interlayer gettering layer and an electrode gettering layer formed on the same solid electrolyte layer constitute a single continuous gettering layer.

The sensor element 101 including the gettering layers 61 to 65 as described above can be formed through procedures shown in FIG. 2 except that, in printing the patterns becoming the gettering layers 61 to 65 after firing in step S2 of FIG. 2, the pastes for formation of the patterns of the gettering layers are each applied to substantially all of the surface of the blank sheet. That is to say, the sensor element 101 illustrated in FIG. 3 has an advantage over the sensor element 101 illustrated in FIG. 1 in that the gettering layers 61 to 65 can be formed more easily and surely because there is no need to form patterns in accordance with the interlayer gettering layers and the electrode gettering layers.

Since zirconia is a main component of each of the gettering layers 61 to 65, formation of gettering layers in portions other than the portions between solid electrolyte layers and the portions between electrodes and solid electrolyte layers does not cause any particular problem.

As yet another example, the gettering layers 61, 63, and 64, which each include both the interlayer gettering layer and the electrode gettering layer, may be formed to be expanded to the portions between interlayer gettering layers and electrode gettering layers and the portions not sandwiched between solid electrolyte layers as illustrated in FIG. 3, and the gettering layer 62, which includes only the interlayer gettering layer portion 62b, and the gettering layer 65, which includes only the electrode gettering layer portion 65a, may be formed as illustrated in FIG. 1.

As described above, according to the present embodiment, oxidation of the electrodes and the heater of the sensor element occurring with continued use of the gas sensor is suppressed by providing, between solid electrolyte layers and between a solid electrolyte layer and an electrode in the sensor element mainly formed of a solid electrolyte, the gettering layers gettering impurities contained in the electrodes and the heater during driving of the element.

<Modifications>

In the above-mentioned embodiment, $SiO_2$ and $Al_2O_3$ are used as substances for causing the gettering layers to develop the gettering effect, but the substances for causing the gettering layers to develop the gettering effect are not limited to these substances. For example, one of zinc oxide, calcium carbonate, barium carbonate, magnesium carbonate, silicon nitride, aluminum nitride, titania, spinel, and the like may be used alone, or two or more types of substances selected from these substances, $SiO_2$, and $Al_2O_3$ may be used. Alternatively, a composite oxide and a composite nitride containing two or more materials selected from these substances may be used.

The sensor element 101 has a serial three-chamber structure including three internal spaces in the above-mentioned embodiment, but is not necessarily required to have the serial three-chamber structure. The above-mentioned effect obtained by including the gettering layers can be obtained also in a sensor element (gas sensor element) having a serial two-chamber structure which includes only two internal spaces and in which the measurement electrode is provided in the second internal space, and the third diffusion control part is provided to cover the measurement electrode.

The gettering layers provided between solid electrolyte layers and between an electrode and a solid electrolyte layer are applied not only to a sensor element (gas sensor element) of a limiting current gas sensor as in the above-mentioned embodiment but also to another gas sensor element formed of a solid electrolyte and maintained to a high temperature for a long time under the atmosphere containing oxygen. The gettering layers may be provided in a mixed potential gas sensor element, for example.

Examples (Composition Analysis)

As an example, the sensor element 101 as illustrated in FIG. 3 was manufactured, and the gas sensor 100 was manufactured using the sensor 101.

Results of composition analysis of the zirconia base and the gettering layers of the sensor element 101 according to the example by X-ray fluorescence (XRF) are shown in Table 1.

TABLE 1

|  | ZIRCONIA BASE (wt %) | GETTERING LAYERS (wt %) |
|---|---|---|
| $ZrO_2$ | 92 | 89 |
| $Y_2O_3$ | 7.1 | 6.8 |
| $SiO_2$ | 0.015 OR LESS | 2.5 |
| $Al_2O_3$ | 0.25 | 1.7 |
| $Fe_2O_3$ | 0.010 OR LESS | 0.01 OR LESS |
| $TiO_2$ | — | 0.01 OR LESS |
| $Na_2O$ | 0.030 OR LESS | 0.03 OR LESS |
| CaO | — | 0.01 OR LESS |
| MgO | — | 0.01 OR LESS |
| $K_2O$ | — | 0.01 OR LESS |
| ($HfO_2$) | (5 OR LESS) | (5 OR LESS) |
| Se | 1 OR LESS | 1 OR LESS |

As shown in Table 1, in each of the zirconia base and the gettering layers, $ZrO_2$ and $Y_2O_3$ constituting zirconia (yttria-stabilized zirconia) were detected as main components. On the other hand, 2.5 wt % of $SiO_2$ and 1.7 wt % of $Al_2O_3$ were detected in the gettering layers, whereas ratios of $SiO_2$ and $Al_2O_3$ in the zirconia base were respectively 0.015 wt % or less and 0.25 wt %, and were sufficiently lower than those in the gettering layers. In each of the zirconia base and the gettering layers, composition ratios of these substances had no significant differences from those in the composition of charge of materials.

In addition to these substances, $Fe_2O_3$, $TiO_2$, $Na_2O$, CaO, MgO, and $K_2O$ were further detected in the gettering layers as trace amounts of impurities. In the zirconia base, $Fe_2O_3$ and $Na_2O$ were detected as trace amounts of impurities, but composition ratios thereof were lower than those in the gettering layers.

As a comparative example, a sensor element was manufactured by bonding the solid electrolyte layers using interlayer bonding layers similar to those used in conventional technology without forming the gettering layers 61 to 65, and forming the electrodes directly on the solid electrolyte layers, and a gas sensor was manufactured using the sensor element. The composition of charge when the zirconia base and the electrodes were formed was the same as that in the example. The composition of charge of the ceramic component of the interlayer bonding layers was the same as that in the zirconia base.

Results of composition analysis of the measurement electrode 44 of the sensor element 101 in each of the example and the comparative example by the X-ray fluorescence (XRF) are shown in Table 2. In Table 2, in each of the example and the comparative example, a composition ratio of the ceramic component was shown while fixing a composition ratio of a metal portion ("METAL" in Table 2) to 60 wt % in advance because the measurement electrode 44 was formed as a cermet electrode containing metal (a Pt alloy) and ceramic at a ratio of 6:4.

TABLE 2

| | MEASUREMENT ELECTRODE (wt %) | |
|---|---|---|
| | COMPARATIVE EXAMPLE | EXAMPLE |
| METAL | 60 | 60 |
| $ZrO_2$ | 36 | 36 |
| $Y_2O_3$ | 2.8 | 2.8 |
| $SiO_2$ | 0.5 | 0.5 |
| $Al_2O_3$ | 0.3 OR LESS | 0.3 OR LESS |
| $Fe_2O_3$ | 0.03 OR LESS | 0.01 OR LESS |
| $TiO_2$ | 0.05 | 0.03 |
| $Na_2O$ | 0.02 OR LESS | 0.01 OR LESS |
| CaO | 0.03 | 0.01 OR LESS |
| MgO | 0.02 | 0.01 OR LESS |
| $K_2O$ | 0.02 OR LESS | 0.01 OR LESS |
| ($HfO_2$) | (2 OR LESS) | (2 OR LESS) |
| Se | 1 OR LESS | 1 OR LESS |

As shown in Table 2, there was no difference between the comparative example and the example in composition ratios of $ZrO_2$ and $Y_2O_3$ as main components and $SiO_2$ and $Al_2O_3$ contained also in the zirconia base. On the other hand, the presence of $Fe_2O_3$, $TiO_2$, $Na_2O$, CaO, MgO, and $K_2O$ as trace amounts of impurities in the measurement electrode was confirmed in each of the example and the comparative example, but composition ratios thereof were lower in the example than in the comparative example.

When the results are taken into consideration together with the difference in composition ratios of the impurities between the zirconia base and the gettering layers shown in Table 1, it is judged that, in the sensor element according to the example, the impurities ($Fe_2O_3$, $TiO_2$, $Na_2O$, CaO, MgO, and $K_2O$) contained in a material for formation of the electrodes have been gettered by the gettering layers at least before completion of the element.

(Atmospheric Durability Test)

Six gas sensors were prepared as each of the above-mentioned example and the comparative example, and an atmospheric durability test was conducted for each of the gas sensors by driving the gas sensor in atmospheric air continuously for 3000 hours. In this case, the NOx current Ip2 flowing through the measurement pump cell 41 was measured at the start of driving, after the elapse of 400 hours, after the elapse of 1000 hours, after the elapse of 2000 hours, and after the elapse of 3000 hours. The sensor element driving temperature was 850° C.

Since the gas sensor was driven in the atmospheric air, the NOx current flowing through the measurement pump cell 41 was actually a so-called offset current flowing through pumping, by measurement pump cell 41, of oxygen remaining in the measurement gas having reached the measurement electrode 44.

Figure 4:
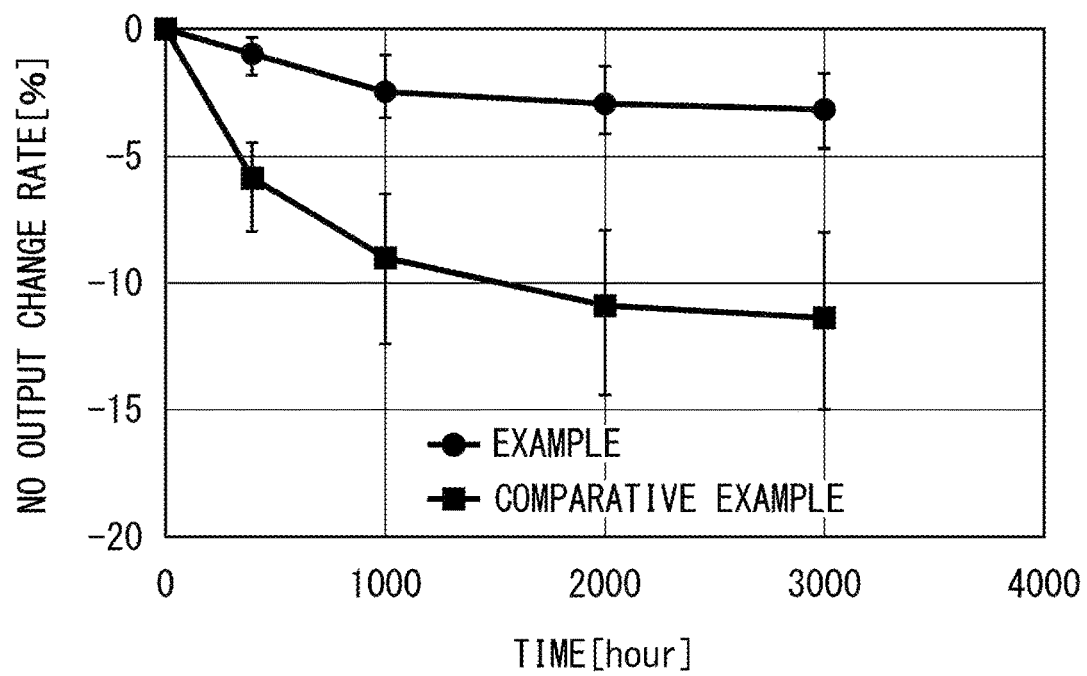
FIG. 4 is a graph showing a change, with respect to an elapsed test time, of an output change rate showing a percentage of reduction of a NOx current in an atmospheric durability test with a NOx current Ip2 at the start of driving as a reference in each of an example and a comparative example.

FIG. 4 is a graph showing a change (described as NO OUTPUT CHANGE RATE in FIG. 4), with respect to an elapsed test time, of an output change rate showing a percentage of reduction of the NOx current in the atmospheric durability test with the NOx current Ip2 at the start of driving as a reference in each of the example and the comparative example. Data points each show an average value of output change rates of the six gas sensors. A range from a maximum value to a minimum value of the output change rate is shown by an error bar.

FIG. 4 shows that the NOx current is reduced more gradually in the example than in the comparative example.

(Diesel Durability Test)

Six gas sensors were prepared as each of the above-mentioned example and the comparative example, and a diesel durability test was conducted for each of the gas sensors by attaching the gas sensor to an exhaust pipe of an diesel engine (displacement: 3000 cc), and driving the gas sensor in the atmosphere of an exhaust gas of the diesel engine continuously for 3000 hours.

The durability test was conducted by repeating a 40-minute driving pattern configured so that an engine speed had a value in a range of 1500 rpm to 3500 rpm, and a load torque had a value in a range of 0 N m to 350 N m until 3000 hours have elapsed. In this case, the temperature of the exhaust gas was 200° C. to 600° C., and the NOx concentration was 0 ppm to 1500 ppm. The sensor element driving temperature was 850° C.

Figure 5:
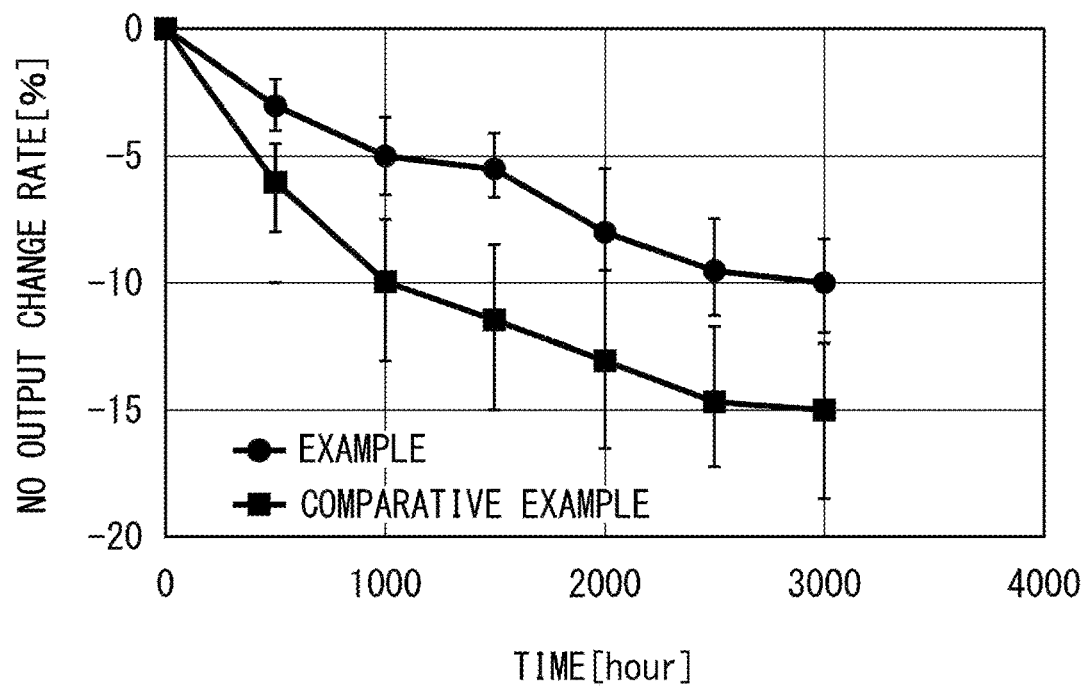
FIG. 5 is a graph showing a change, with respect to an elapsed test time, of an output change rate showing a percentage of reduction of the NOx current in a diesel durability test with the NOx current Ip2 at the start of driving as a reference in each of the example and the comparative example.

FIG. 5 is a graph showing a change (described as NO OUTPUT CHANGE RATE in FIG. 5), with respect to an elapsed test time, of an output change rate showing a percentage of reduction of the NOx current in the diesel durability test with the NOx current Ip2 at the start of driving as a reference in each of the example and the comparative example. More specifically, FIG. 5 shows the output change rate after the elapse of every 500 hours from the start of driving until 3000 hours have elapsed. Data points each show an average value of output change rates of the six gas sensors. A range from a maximum value to a minimum value of the output change rate is shown by an error bar.

As in a case of FIG. 4, FIG. 5 shows that the NOx current is reduced more gradually in the example than in the comparative example.

When the results of FIGS. 4 and 5 are totally taken into consideration, the fact that there arise differences as shown in FIGS. 4 and 5 between the example and the comparative example, while each of the sensor elements is maintained to a high element driving temperature of 850° C. for a long time in the atmospheric air or in the atmosphere of the diesel exhaust gas, suggests that the gettering layers provided as in the example to getter the impurities to thereby reduce the composition ratios of the impurities in the measurement electrode are effective in reducing and suppressing NOx sensitivity of the sensor element.

In the diesel durability test, V-I characteristics of the gas sensor in each of the example and the comparative example were evaluated under a reference NO gas both before the start of the test and after the driving of 3000 hours. The reference NO gas is herein a gas mixing a NO gas to $N_2$ as a base gas and having been adjusted to have a given concentration in a model gas apparatus.

Figure 6:
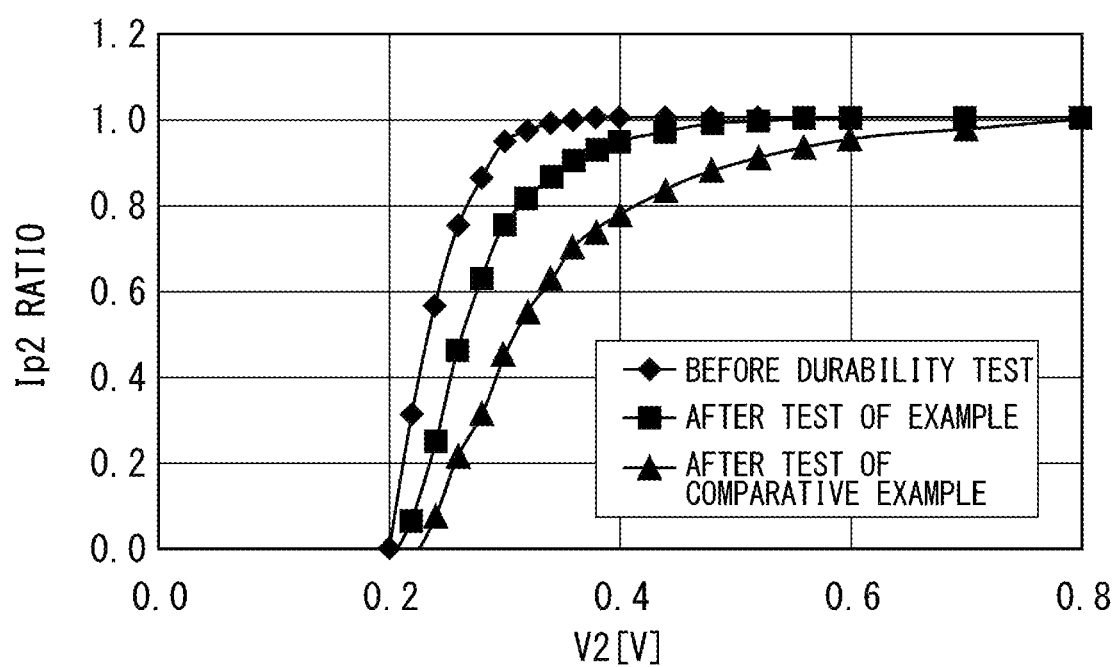
FIG. 6 shows V-I characteristics of a gas sensor in the example before the start of the test and after the elapse of 3000 hours and V-I characteristics of a gas sensor in the comparative example after the elapse of 3000 hours.

FIG. 6 shows V-I characteristics of the gas sensor in the example before the start of the test (described as BEFORE DURABILITY TEST in FIG. 6) and after the elapse of 3000 hours (described as AFTER TEST OF EXAMPLE in FIG. 6) and V-I characteristics of the gas sensor in the comparative example after the elapse of 3000 hours (described as AFTER TEST OF COMPARATIVE EXAMPLE in FIG. 6). In FIG. 6, a value of the vertical axis represents, in place of the NOx current Ip2 itself, a value (Ip2 ratio) normalized by setting a saturation value (limiting current value) of the NOx current Ip2 in the V-I characteristics of the gas sensor in the example before the start of the test to 1. The horizontal axis represents the electromotive force V2 generated in the measurement sensor cell 82 when the pump voltage Vp2 applied to the measurement pump cell 41 is swept, that is, electromotive force corresponding to the oxygen concentration in the third internal space 60.

The V-I characteristics of the gas sensor in the comparative example before the start of the test have no significant difference from the V-I characteristics of the gas sensor in the example before the start of the test. The V-I characteristics of the gas sensor in the example before the start of the test shown in FIG. 6 thus virtually correspond to the V-I characteristics of the gas sensor in the comparative example before the start of the test. In each of the three types of the V-I characteristics shown in FIG. 6, a region in which a value of the electromotive force V2 is relatively large is a plateau region in which the Ip2 ratio (NOx current Ip2) is constant regardless of the electromotive force V2. The plateau region is generated for limiting the amount of NOx flowing into the third internal space 60 in which the measurement electrode 44 is present by the diffusion control parts of the sensor element, to thereby limit the magnitude of a current generated through reduction and decomposition of NOx. In the gas sensor, the value of the electromotive force V2 is controlled to be an appropriate voltage in the plateau region to extract the NOx current Ip2 in accordance with the NOx concentration, and to specify the NOx concentration based on the NOx current Ip2.

On the other hand, a region in which the value of the electromotive force V2 is relatively small is a rising region in which the Ip2 ratio (NOx current Ip2) changes depending on the electromotive force V2. The relationship between the electromotive force V2 and the NOx current Ip2 in the rising region is determined by a gradient (change rate) in accordance with electrical resistance of the zirconia base and reaction resistance of the electrodes. A smaller gradient indicates a greater value of the resistance.

According to the results shown in FIG. 6, the V-I characteristics after the durability test tend to have a smaller gradient in the rising region than those before the test in each of the example and the comparative example, and the tendency is more noticeable in the comparative example. In the example, the V-I characteristics reach the plateau region when V2 is in a range of about 0.4 V to 0.5 V, but, in the comparative example, the V-I characteristics reach the plateau region only after V2 exceeds 0.7 V.

A smaller gradient, or a greater value of the resistance in the rising region after the diesel durability test than that before the test means that the reaction resistance has increased as a result of deactivation of catalytic activity of the measurement electrode 44.

A smaller change in gradient in the example means that deactivation of catalytic performance of the measurement electrode is suppressed by providing the gettering layers as in the example to getter impurities.

In light of the results, the gettering layers provided to the sensor element of the gas sensor as in the above-mentioned embodiment are effective in maintaining the catalytic activity of the measurement electrode of the sensor element of the gas sensor to be used on a long-term basis.

The invention claimed is:

1. A gas sensor element including a plurality of solid electrolyte layers stacked one over another, said gas sensor element comprising:

an electrochemical cell including electrodes formed over portions of said plurality of solid electrolyte layers;

a heater part capable of heating said gas sensor element; and a gettering layer located between said plurality of solid electrolyte layers including an interlayer gettering layer portion and an electrode gettering layer portion, said electrode gettering layer portion located between said portions of said plurality of solid electrolyte layers and said electrodes, said gettering layer gettering impurities diffused inside the sensor element from a metal component of said electrodes and said heater part during driving of said gas sensor element, wherein said plurality of solid electrolyte layers are made of zirconia, and said gettering layer is made of zirconia to which at least one selected from the group consisting of $SiO_2$, $Al_2O_3$, zinc oxide, calcium carbonate, barium carbonate, magnesium carbonate, silicon nitride, aluminum nitride, titania, and spinel is added.

2. The gas sensor element according to claim 1, wherein said gettering layer is made of zirconia into which $SiO_2$ and $Al_2O_3$ are added at a weight ratio of 0.5 wt % to 12 wt % in total.

3. The gas sensor element according to claim 2, wherein said gettering layer is made of zirconia into which $SiO_2$ and $Al_2O_3$ are added at a weight ratio of 1 wt % to 10 wt % in total.

4. The gas sensor element according to claim 3, wherein said interlayer gettering layer portion and said electrode gettering layer portion are formed on the same solid electrolyte layer of said plurality of solid electrolyte layers as a single continuous gettering layer.

5. The gas sensor element according to claim 4, wherein said gettering layer is located on substantially all of a surface of an adjacent solid electrolyte layer of said plurality of solid electrolyte layers.

6. The gas sensor element according to claim 2, wherein said interlayer gettering layer portion and said electrode gettering layer portion are formed on the same solid electrolyte layer of said plurality of solid electrolyte layers as a single continuous gettering layer.

7. The gas sensor element according to claim 6, wherein said gettering layer is located on substantially all of a surface of an adjacent solid electrolyte layer of said plurality of solid electrolyte layers.

8. The gas sensor element according to claim 1, wherein said interlayer gettering layer portion and said electrode gettering layer portion are formed on the same solid electrolyte layer of said plurality of solid electrolyte layers as a single continuous gettering layer.

9. The gas sensor element according to claim 8, wherein said gettering layer is located on substantially all of a surface of an adjacent solid electrolyte layer of said plurality of solid electrolyte layers.

* * * * *